US008938642B2

(12) United States Patent
Gonion (10) Patent No.: US 8,938,642 B2
(45) Date of Patent: Jan. 20, 2015

(54) CONFIRM INSTRUCTION FOR PROCESSING VECTORS

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 13/479,097

(22) Filed: May 23, 2012

(65) Prior Publication Data

US 2012/0233507 A1    Sep. 13, 2012

Related U.S. Application Data

(63) Continuation-in-part of application No. 12/873,063, filed on Aug. 31, 2010, now Pat. No. 8,271,832, and a continuation-in-part of application No. 12/541,546, filed on Aug. 14, 2009, now Pat. No. 8,359,461.

(60) Provisional application No. 61/089,251, filed on Aug. 15, 2008.

(51) Int. Cl.
*G06F 11/00*    (2006.01)
*G06F 9/38*    (2006.01)
*G06F 9/45*    (2006.01)
*G06F 9/30*    (2006.01)

(52) U.S. Cl.
CPC ............... *G06F 9/3865* (2013.01); *G06F 8/41* (2013.01); *G06F 8/4441* (2013.01); *G06F 8/456* (2013.01); *G06F 9/30036* (2013.01); *G06F 9/30072* (2013.01); *G06F 9/30076* (2013.01)
USPC .......................... 714/10; 714/3; 712/2; 712/5

(58) Field of Classification Search
CPC . G06F 11/07; G06F 11/0703; G06F 11/0706; G06F 11/0715; G06F 11/0721; G06F 11/0724; G06F 11/0772; G06F 11/18; G06F 11/20; G06F 11/27; G06F 11/30; G06F 11/3024
USPC ............... 714/2, 3, 11, 19, 20, 21, 35, 41, 10; 712/2, 5, 7, 224
See application file for complete search history.

(56) References Cited

U.S. PATENT DOCUMENTS

| 5,113,521 | A | * | 5/1992 | McKeen et al. ................. 714/15 |
|---|---|---|---|---|
| 5,381,536 | A | | 1/1995 | Phelps |
| 5,598,574 | A | * | 1/1997 | Yoshinaga et al. ................ 712/2 |
| 5,781,752 | A | | 7/1998 | Moshovos |
| 5,953,241 | A | | 9/1999 | Hansen |
| 6,115,808 | A | | 9/2000 | Arora |
| 6,295,599 | B1 | | 9/2001 | Hansen |
| 6,308,250 | B1 | | 10/2001 | Klausler |
| 6,584,482 | B1 | | 6/2003 | Hansen |
| 6,643,765 | B1 | | 11/2003 | Hansen |

(Continued)

*Primary Examiner* — Joseph D Manoskey
(74) *Attorney, Agent, or Firm* — Park, Vaughan, Fleming & Dowler LLP; Anthony P. Jones (57) ABSTRACT

The described embodiments include a processor with a fault status register (FSR) that executes a Confirm instruction. In these embodiments, when executing the Confirm instruction, the processor receives a predicate vector that includes N elements. For a first set of bit positions in the FSR for which corresponding elements of the predicate vector are active, the processor determines if at least one of the first set of bit positions in the FSR holds a predetermined value. When at least one of the first set of bit positions in the FSR holds the predetermined value, the processor causes a fault in the processor.

21 Claims, 4 Drawing Sheets

(56) References Cited

U.S. PATENT DOCUMENTS

| | | |
|---|---|---|
| 6,725,356 B2 | 4/2004 | Hansen |
| 7,213,131 B2 | 5/2007 | Hansen |
| 7,216,217 B2 | 5/2007 | Hansen |
| 7,260,708 B2 | 8/2007 | Hansen |
| 7,301,541 B2 | 11/2007 | Hansen |
| 7,353,367 B2 | 4/2008 | Hansen |
| 7,430,655 B2 | 9/2008 | Hansen |
| 7,464,252 B2 | 12/2008 | Hansen |
| 7,509,366 B2 | 3/2009 | Hansen |
| 7,516,308 B2 | 4/2009 | Hansen |
| 7,653,806 B2 | 1/2010 | Hansen |
| 7,660,972 B2 | 2/2010 | Hansen |
| 7,660,973 B2 | 2/2010 | Hansen |
| 7,730,287 B2 | 6/2010 | Hansen |
| 2004/0068642 A1* | 4/2004 | Tanaka et al. ............... 712/223 |
| 2007/0118720 A1* | 5/2007 | Espasa et al. ............... 712/5 |
| 2008/0016320 A1* | 1/2008 | Menon et al. ............... 712/22 |
| 2008/0082785 A1* | 4/2008 | Jourdan et al. ............... 712/5 |
| 2010/0115233 A1* | 5/2010 | Brewer et al. ............... 712/7 |
| 2010/0312988 A1* | 12/2010 | Bjorklund et al. ............... 712/7 |

* cited by examiner

CONFIRM INSTRUCTION FOR PROCESSING VECTORS

RELATED APPLICATIONS

This application is a continuation in part of, and hereby claims priority under 35 U.S.C. §120 to, pending U.S. patent application Ser. No. 12/873,063, entitled "Non-Faulting and First-Faulting Instructions for Processing Vectors," by inventor Jeffry E. Gonion and Keith E. Diefendorff, filed 31 Aug. 2010. This application is also a continuation in part of, and hereby claims priority under 35 U.S.C. §120 to, pending U.S. patent application Ser. No. 12/541,546, entitled "Running-Shift Instructions for Processing Vectors," by inventors Jeffry E. Gonion and Keith E. Diefendorff, filed 14 Aug. 2009. This application further claims priority under 35 U.S.C. §120 to U.S. provisional patent application No. 61/089,251, entitled "Macroscalar Processor Architecture," by inventor Jeffry E. Gonion, filed 15 Aug. 2008, to which the parent application Ser. Nos. 12/541,546 and 12/086,063 also claim priority. These applications are each herein incorporated by reference.

This application is related to: (1) pending application Ser. No. 12/419,629, entitled "Method and Apparatus for Executing Program Code," by inventors Jeffry E. Gonion and Keith E. Diefendorff, filed on 7 Apr. 2009; (2) pending application Ser. No. 12/419,644, entitled "Break, Pre-Break, and Remaining Instructions for Processing Vectors," by inventors Jeffry E. Gonion and Keith E. Diefendorff, filed on 7 Apr. 2009; (3) pending application Ser. No. 12/419,661, entitled "Check-Hazard Instructions for Processing Vectors," by inventors Jeffry E. Gonion and Keith E. Diefendorff, filed on 7 Apr. 2009; (4) pending application Ser. No. 12/495,656, entitled "Copy-Propagate, Propagate-Post, and Propagate-Prior Instructions For Processing Vectors," by inventors Jeffry E. Gonion and Keith E. Diefendorff, filed on 30 Jun. 2009; (5) pending application Ser. No. 12/495,643, entitled "Shift-In-Right Instructions for Processing Vectors," by inventors Jeffry E. Gonion and Keith E. Diefendorff, filed on 30 Jun. 2009; (6) pending application Ser. No. 12/495,631, entitled "Increment-Propagate and Decrement-Propagate Instructions for Processing Vectors," by inventors Jeffry E. Gonion and Keith E. Diefendorff, filed on 30 Jun. 2009; (7) pending application Ser. No. 12/541,505, entitled "Running-Sum Instructions for Processing Vectors," by inventors Jeffry E. Gonion and Keith E. Diefendorff, filed on 14 Aug. 2009; and (8) pending application Ser. No. 12/541,526, entitled "Running-AND, Running-OR, Running-XOR, and Running-Multiply Instructions for Processing Vectors," by inventors Jeffry E. Gonion and Keith E. Diefendorff, filed on 14 Aug. 2009.

This application is also related to: (1) pending application Ser. No. 12/873,043, entitled "Running-Min and Running-Max Instructions for Processing Vectors," by inventors Jeffry E. Gonion and Keith E. Diefendorff, filed 31 Aug. 2010; (2) pending application Ser. No. 12/873,063, entitled "Non-Faulting and First-Faulting Instructions for Processing Vectors," by inventors Jeffry E. Gonion and Keith E. Diefendorff, filed 31 Aug. 2010; (3) pending application Ser. No. 12/873,074, entitled "Vector Test Instruction for Processing Vectors" by inventors Jeffry E. Gonion and Keith E. Diefendorff, filed 31 Aug. 2010; (4) pending application Ser. No. 12/907,471, entitled "Select First and Select Last Instructions for Processing Vectors," by inventors Jeffry E. Gonion and Keith E. Diefendorff, filed 19 Oct. 2010; (5) pending application Ser. No. 12/907,490, entitled "Actual Instruction and Actual-Fault Instructions for Processing Vectors," by inventors Jeffry E. Gonion and Keith E. Diefendorff, filed 19 Oct. 2010; (6) pending application Ser. No. 12/977,333, entitled "Remaining Instruction for Processing Vectors," by inventors Jeffry E. Gonion and Keith E. Diefendorff, filed 23 Dec. 2010; (7) pending application Ser. No. 13/006,243, entitled "Remaining Instruction for Processing Vectors," by inventors Jeffry E. Gonion and Keith E. Diefendorff, filed 13 Jan. 2011; (8) pending application Ser. No. 13/189,140, entitled "GetFirst and AssignLast Instructions for Processing Vectors," by inventors Jeffry E. Gonion and Keith E. Diefendorff, filed 22 Jul. 2011; (9) pending application Ser. No. 13/291,931, entitled "Vector Index Instruction for Processing Vectors," by inventor Jeffry E. Gonion and Kieth E. Diefendorff, filed 8 Nov. 2011; (10) pending application Ser. No. 13/343,619, entitled "Predicate Count and Segment Count Instructions for Processing Vectors" by inventor Jeffry E. Gonion, filed on 4 Jan. 2012; (11) pending application Ser. No. 13/414,606, entitled "Predicting Branches for Vector Partitioning Loops when Processing Vector Instructions" by inventor Jeffry E. Gonion, filed on 7 Mar. 2012; (12) pending application Ser. No. 13/456,371, entitled "Running Unary Operation Instructions for Processing Vectors" by inventor Jeffry E. Gonion, filed on 26 Apr. 2012; and (13) pending application Ser. No. 13/463,454, entitled "Running Multiply Accumulate Instruction for Processing Vectors" by inventor Jeffry E. Gonion, filed on May 3, 2012.

This application is also related to: (1) pending application Ser. No. 12/237,212, entitled "Conditional Data-Dependency Resolution in Vector Processors," by inventors Jeffry E. Gonion and Keith E. Diefendorff, filed 24 Sep. 2008; (2) pending application Ser. No. 12/237,196, entitled "Generating Stop Indicators Based on Conditional Data Dependency in Vector Processors," by inventors Jeffry E. Gonion and Keith E. Diefendorff, filed 24 Sep. 2008; (3) pending application Ser. No. 12/237,190, entitled "Generating Predicate Values Based on Conditional Data Dependency in Vector Processors," by inventors Jeffry E. Gonion and Keith E. Diefendorff, filed 24 Sep. 2008; (4) application Ser. No. 11/803,576, entitled "Memory-Hazard Detection and Avoidance Instructions for Vector Processing," by inventors Jeffry E. Gonion and Keith E. Diefendorff, filed 14 May 2007, which has been issued as U.S. Pat. No. 8,019,976; and (5) pending application Ser. No. 13/224,170, entitled "Memory-Hazard Detection and Avoidance Instructions for Vector Processing," by inventors Jeffry E. Gonion and Keith E. Diefendorff, filed 14 May 2007.

BACKGROUND

1. Field

The described embodiments relate to techniques for improving the performance of computer systems. More specifically, the described embodiments relate to a Confirm instruction for processing vectors.

2. Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments include a processor (e.g., processor 102 in FIG. 1) that includes fault status register (FSR) that executes a Confirm instruction. In these embodiments, when executing the Confirm instruction, the processor receives a predicate vector that includes N elements. For a first set of bit positions in the FSR for which corresponding elements of the predicate vector are active, the processor determines if at least one of the first set of bit positions in the FSR holds a predetermined value. When at least one of the first set of bit positions in the FSR holds the predetermined value, the processor causes a fault in the processor.

In some embodiments, the processor does not cause a fault when none of the first set of bit positions in the FSR holds the predetermined value.

In some embodiments, the processor does not causing a fault when one or more of a second set of bit positions in the FSR for which corresponding elements of the predicate vector are inactive hold the predetermined value.

In some embodiments, before receiving the predicate vector, the processor performs a vector operation for each of N elements, wherein the operation for each element potentially causes a fault. Upon determining that at least one element of the vector operation has encountered a fault condition, the processor masks a fault for the at least one element and sets a corresponding bit position of the FSR to the predetermined value, wherein, when masking the fault, the processor finishes performing the vector operation without immediately handling the fault.

In some embodiments, when setting a corresponding bit position of the FSR to the predetermined value, the processor sets the bit position and any subsequent bit positions of the FSR to the predetermined value.

In some embodiments, when causing a fault in the processor, the processor terminates at least one program that is being executed by the processor.

In some embodiments, the set of positions in the FSR for which corresponding elements of the predicate vector are active comprises one or more bit positions in the FSR.

In some embodiments, the predetermined value is a zero.
In some embodiments, the predetermined value is a one.

BRIEF DESCRIPTION OF THE FIGURES

In the figures, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, such as flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), and/or other mediums capable of storing data structures or code. Note that in the described embodiments, the computer-readable storage medium does not include non-statutory computer-readable storage mediums such as transitory signals.

The methods and processes described in this detailed description can be included in one or more hardware modules. For example, the hardware modules can include, but are not limited to, processors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When computer system (e.g., a processor in the computer system) reads and executes the code and/or data stored on the computer-readable storage medium, the computer system performs the methods and processes embodied as data structures and code and stored within the computer-readable storage medium.

In the following description, we refer to "some embodiments." Note that "some embodiments" describes a subset of all of the possible embodiments, but does not necessarily always specify the same subset of the embodiments.

Macroscalar Architecture

The embodiments described herein are based in part on the Macroscalar Architecture that is described in U.S. patent application Ser. No. 12/873,063, entitled "Non-Faulting and First-Faulting Instructions for Processing Vectors," by inventor Jeff Gonion, filed 31 Aug. 2010, and U.S. patent application Ser. No. 12/541,546, entitled "Running-Shift Instructions for Processing Vectors," by inventors Jeffry E. Gonion and Keith E. Diefendorff, filed 14 Aug. 2009, (hereinafter, "the '063 and '546 applications"), the contents of which are (as described above) incorporated by reference.

As recited in the '063 and '546 applications, the described embodiments provide an instruction set and supporting hardware that allow compilers to generate program code for loops without completely determining parallelism at compile-time, and without discarding useful static analysis information. Specifically, these embodiments provide a set of instructions that do not mandate parallelism for loops but instead enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

These embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs processor 102 how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error (which can be called "vector partitioning"). This approach defers the determination of parallelism to runtime, where the information on runtime dependencies is available, thereby allowing the software and processor to adapt parallelism to dynamically changing conditions (i.e., based on data that is not available at compile-time).

Vectorized program code can comprise vector-control instructions and vector instructions forming a loop in the vectorized program code that performs vector operations based on a corresponding loop in program code. The vector control instructions can determine iterations of the loop in program code that are safe to execute in parallel (because, e.g., no runtime data dependencies have occurred), and the vector instructions can be executed using predication and/or other dynamic controls to limit the elements of the vector instruction that are processed in parallel to the determined-safe iterations. (Recall that, in the described embodiments, each element of a vector instruction can perform an operation (or operations) for corresponding iterations of a loop in the program code.)

Encountering Loop Termination Conditions in Macroscalar Processors

As described above, when a loop in program code has been vectorized, a single vector instruction can perform operations for multiple iterations of the loop in parallel, with each element of the vector instruction performing the operation for a different iteration of the loop. Normally, this vectorization only processes iterations of the loop intended by the programmer (i.e., program code loops that would have been executed if the loop program had been executed without vectorization), resulting in the same results from the vectorized code that would have been obtained by processing the original scalar/non-vectorized code for the loop. However, for some loops, a termination condition can be encountered partway through the loop's iterations, and the loop can break out of the loop mid-iteration. The vectorized code for such loops can sometimes perform operations associated with loop iterations beyond the termination condition. This can cause problems, for example, where the termination condition is determined based on an outcome of a memory read. If a vector of addresses are read in parallel in vectorized code to determine if the termination condition is met and hence the loop should break partway through a vector, it is possible that the vectorized code will read memory locations that would not have been read by the corresponding scalar/non-vectorized code for the loop (e.g., to read illegal addresses). When a read of an illegal address occurs, the program may be terminated by the processor/operating system.

Existing systems based on the Macroscalar architecture include some mechanisms for avoiding program termination in the above-described situations. However, the overhead associated with using these mechanisms can be significant. This can mean that the overhead can be a majority of the work performed when vectorizing loops—particularly simple loops. The described embodiments provide simpler and lower-overhead solution to the above-described problem in the form of the Confirm instruction described in the instant application.

TERMINOLOGY

Throughout the description, we use the following terminology. These terms may be generally known in the art, but are described below to clarify the subsequent descriptions.

The term "active" or "active element," as used in this description to refer to one or more elements of a vector, indicates elements that are operated on during a given operation. Generally, the described embodiments enable a vector execution unit to selectively perform operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" or "control vector" can include "active" elements that are used to determine which elements in the operand vector to perform operations on. In some embodiments, elements that contain data of a predetermined type are active elements (e.g., true, false, non-zero, zero, uppercase/lowercase characters, even/odd/prime numbers, vowels, whole numbers, etc.).

The terms "true" and "false" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

In the following examples, "corresponding elements" may be described. Generally, corresponding elements are elements at a same element position in two or more different vectors. For example, when a value is copied from an element in an input vector into a "corresponding element" of a result vector, the value is copied from an nth element in the input vector into an nth element in the result vector.

In the following examples, "relevant" elements may be described. In the described embodiments, a relevant element is an element in a given vector for which the corresponding element in one or more other vectors (e.g., a control vector and/or predicate vector) is/are active. For example, given an input control vector for which only a fourth element is active, a second input vector only has one relevant element—the fourth element.

In this description, for clarity, operations performed for "vector instructions and/or operations" may be described generally as operations performed for "vector instructions," however, in the described embodiments "vector operations" can be handled in similar ways.

NOTATION

In describing the embodiments in the instant application, we use the following formats for variables, which are vector quantities unless otherwise noted:

p5=a<b;
  Elements of vector p5 are set to 0 or 1 depending on the result of the comparison operation a<b. Note that vector p5 can be a predicate vector that can be used to control the number of elements of one or more vector instructions that execute in parallel.

~p5; a=b+c;
  Only elements in vector a designated by active (i.e., non-zero) elements in the predicate vector p5 receive the result of b+c. The remaining elements of a are unchanged. This operation is called "predication," and is denoted using the tilde ("~") before the predicate vector.

!p5; a=b+c;
  Only elements in vector a designated by active (e.g., non-zero) elements in the predicate vector p5 receive the result of b+c. The remaining elements of a are set to zero. This operation is called "zeroing," and is denoted using the exclamation point ("!") before the predicate vector.

--- if (FIRST ( )) goto . . . ; Also LAST ( ), ANY ( ), ALL ( ), CARRY ( ), ABOVE ( ), or NONE ( ), (where ANY ( ) == !NONE ( ))

---

These instructions test the processor status flags and branch accordingly.

x+=VECLEN;
  VECLEN is a value that communicates the number of elements per vector. The value is determined at runtime by the processor 102 (see FIG. 1), rather than being determined by the compiler/assembler.

// Comment
  In a similar way to many common programming languages, the examples presented below use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors discussed herein are vectors of integers, but alternative embodiments support other data formats.

INSTRUCTION DEFINITIONS

In the described embodiments, processor 102 supports vector instructions and/or operations for which faults for some or all of the elements in the vector instruction and/or operation can be masked. (Note that, in this description, for clarity, "vector instructions and/or operations" may be described simply as "vector instructions;" however, "vector operations" can be handled in similar ways.) For example, processor 102 can support vector read instructions, vector write instructions, vector mathematical instructions, and other vector instructions for which faults for some or all of the elements can be masked. When masking faults for vector instructions, processor 102 can ignore faulting conditions that occur for one or more elements in the vector instruction, and can complete execution of the vector instruction as if the fault condition had not been encountered. However, in these embodiments, when a fault is masked for a given element in the vector instruction, processor 102 clears a corresponding bit position and subsequent bit positions in a fault status register (FSR) 214 in order to record the element position where a fault was encountered. Some examples of masking faults for instructions and using a fault-status register are presented in the '063 application, which is (as described above) incorporated by reference.

The described embodiments include a Confirm instruction. Generally, the Confirm instruction uses elements in an FSR 214 in processor 102 to determine if one or more faults was masked for an earlier vector instruction. When one or more faults was masked for an earlier vector instruction, the Confirm instruction causes processor 102 to fault/throw an exception. More specifically, if at least one active bit position in FSR 214 indicates that a fault was masked, the Confirm instruction causes processor 102 to cause the fault/throw the exception (note that a bit position of FSR 214 is active when a corresponding element of a predicate vector is active). For example, assume that at least one element of a prior vector read operation caused processor 102 to perform a read from an illegal address, but that processor 102 masked the fault and cleared a corresponding bit in FSR 214. Upon executing the Confirm instruction, assuming further that the previously-cleared bit in FSR 214 is active, processor 102 can determine that the fault was masked for an active bit position in FSR 214, and can cause a fault. By using the Confirm instruction, the described embodiments can help avoid the need for using complex code to handle faults in vector instructions, thereby reducing the overhead for vectorizing program code.

In the described embodiments, when executing the Confirm instruction, the fault caused by processor 102 upon determining that a bit position in FSR 214 is cleared can be any fault supported by processor 102. In some embodiments, the fault causes processor 102 to terminate one or more programs executing on processor 102. For example, in the case of the read from the illegal address described above, as part of processing the fault processor 102 can terminate at least program that caused the read from the illegal address.

Although certain arrangements of instructions are used in describing the Confirm instruction, a person of skill in the art will recognize that these concepts may be implemented using different arrangements or types of instructions without departing from the spirit of the described embodiments. Additionally, the Confirm instruction is described using a signed-integer data type. However, in alternative embodiments, other data types or formats are used. Moreover, although Macroscalar instructions may take vector, scalar, or immediate arguments in practice, vector arguments are described herein.

For the purposes of explanation, the vector data type is defined as a C++ class containing an array v[ ] of elements that comprise the vector. Within these descriptions, the variable VECLEN indicates the size of the vector. In some embodiments, VECLEN is constant.

Note that the format of the following instruction definitions is a statement of the instruction type followed by a description of the instruction that can include example code as well as one or more usage examples.

Confirm

The Confirm instruction takes a predicate vector as an input. When executed, the Confirm instruction causes processor 102 to determine if each active bit position of FSR 214 is set to zero (or "cleared"). When an active bit position of the FSR is cleared, Confirm the instruction causes processor 102 to cause a fault/throw an exception (which is generically labeled as "fault" below). As shown below, an active bit position of the FSR is a bit position for which a corresponding element of the predicate vector is active.

```
void Confirm(vector pred, vector FSR)
{
    for (x=0; x<VECLEN; ++x)
    {
        if (pred[x])
        {
            if (FSR[x] == 0)
                fault;
        }
    }
}
```

Examples:

| | Confirm(pred, FSR) | | | | | | | | |
|---|---|---|---|---|---|---|---|---|---|
| On Entry: | FSR = | { 1 | 1 | 1 | 1 | 1 | 0 | 0 | 0 } |
| | pred = | { 1 | 1 | 1 | 1 | 1 | 1 | 1 | 0 } |
| Result: | fault (6th bit position) | | | | | | | | | and

| | Confirm(pred, FSR); | | | | | | | | |
|---|---|---|---|---|---|---|---|---|---|
| On Entry: | FSR = | { 1 | 1 | 1 | 1 | 1 | 1 | 1 | 0 } |
| | pred = | { 1 | 1 | 1 | 1 | 1 | 1 | 1 | 0 } |
| Result: | no fault | | | | | | | | |

Computer System

Figure 1:
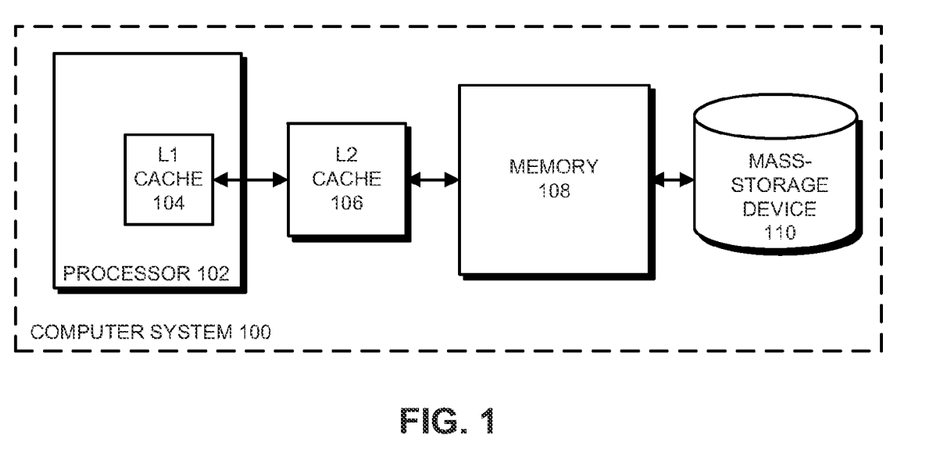
FIG. 1 presents a block diagram of a computer system in accordance with the described embodiments.

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

In some embodiments, the devices in the memory hierarchy (i.e., L1 cache 104, etc.) can access (i.e., read and/or write) multiple cache lines per cycle. These embodiments enable more effective processing of memory accesses that occur based on a vector of pointers or array indices to non-contiguous memory addresses. In addition, in some embodiments, the caches in the memory hierarchy are divided into a number of separate banks, each of which can be accessed in parallel. Banks within caches and parallel accesses of the banks are known in the art and hence are not described in more detail.

Computer system 100 can be incorporated into many different types of electronic devices. For example, computer system 100 can be part of a desktop computer, a laptop computer, a tablet computer, a server, a media player, an appliance, a cellular phone, a piece of testing equipment, a network appliance, a personal digital assistant (PDA), a hybrid device (i.e., a "smart phone"), or another electronic device.

Although we use specific components to describe computer system 100, in alternative embodiments, different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and mass-storage device 110.

Processor

Figure 2:
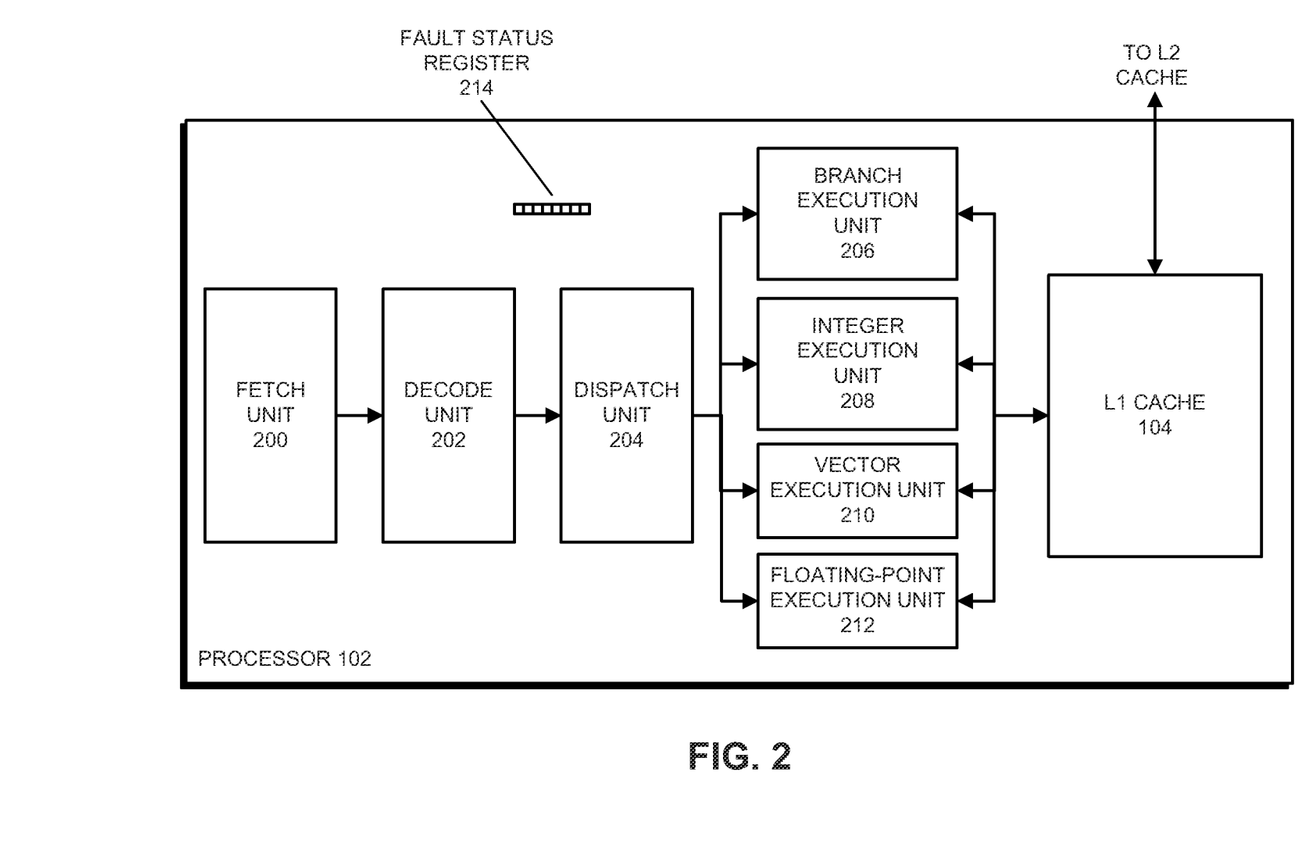
FIG. 2 presents an expanded view of a processor in accordance with the described embodiments.

FIG. 2 presents an expanded view of processor 102 in accordance with the described embodiments. As shown in FIG. 2, processor 102 includes L1 cache 104, fetch unit 200, decode unit 202, dispatch unit 204, branch execution unit 206, integer execution unit 208, vector execution unit 210, floating-point execution unit 212 (branch execution unit 206, integer execution unit 208, vector execution unit 210, and floating-point execution unit 212 as a group are interchangeably referred to as "the execution units"). Processor 102 also includes fault status register (FSR) 214.

Fetch unit 200 fetches instructions from the memory hierarchy in computer system 100 and forwards the fetched instructions to be decoded in decode unit 202 for eventual execution in the execution units. Generally, fetch unit 200 attempts to fetch instructions from the closest portion of the memory hierarchy first, and if the instruction is not found at that level of the memory hierarchy, proceeds to the next level in the memory hierarchy until the instruction is found. For example, in some embodiments, fetch unit can request instructions from L1 cache 104 (which can comprise a single physical cache for instructions and data, or can comprise physically separate instruction and data caches). Aside from the operations herein described, the operations of fetch units are generally known in the art and hence are not described in more detail.

Decode unit 202 decodes the instructions and assembles executable instructions to be sent to the execution units, and dispatch unit 204 receives decoded instructions from decode unit 202 and dispatches the decoded instructions to the appropriate execution unit. For example, dispatch unit 204 can dispatch branch instructions to branch execution unit 206, integer instructions to integer execution unit 208, etc.

Each of execution units 206-212 is used for performing computational operations, such as logical operations, mathematical operations, or bitwise operations for an associated type of operand or operation. More specifically, integer execution unit 208 is used for performing computational operations that involve integer operands, floating-point execution unit 212 is used for performing computational operations that involve floating-point operands, vector execution unit 210 is used for performing computational operations that involve vector operands, and branch execution unit 206 is used for performing operations for resolving branches. Integer execution units, branch execution units, and floating-point execution units are generally known in the art and are not described in detail.

Figure 3:
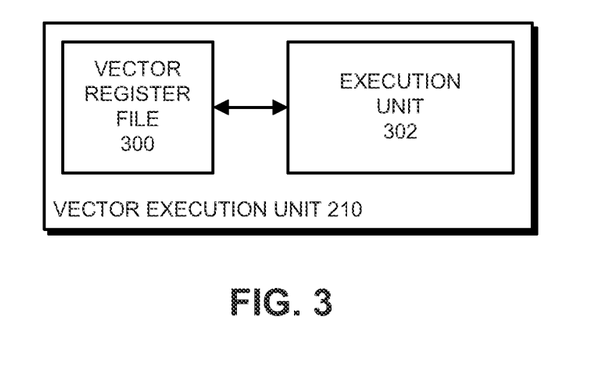
FIG. 3 presents an expanded view of a vector execution unit in accordance with the described embodiments.

In the described embodiments, vector execution unit 210 is a single-instruction-multiple-data (SIMD) execution unit that performs operations in parallel on some or all of the data elements that are included in vectors of operands. FIG. 3 presents an expanded view of vector execution unit 210 in accordance with the described embodiments. As is shown in FIG. 3, vector execution unit 210 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Vector execution unit 302 retrieves operands from registers in vector register file 300 and executes vector instructions that cause execution unit 302 to perform operations in parallel on some or all of the data elements (or, simply, "elements") in the operand vector. For example, execution unit 302 can perform logical operations, mathematical operations, or bitwise operations on the elements in the vector. Execution unit 302 can perform one vector operation per cycle (although the "cycle" may include more than one cycle of a clock used to trigger, synchronize, and/or control execution unit 302's computational operations).

In the described embodiments, execution unit 302 supports vectors that hold N data elements (e.g., bytes, words, doublewords, etc.). In these embodiments, execution unit 302 can perform operations on Nor fewer of the data elements in an operand vector in parallel. For example, assuming an embodiment where the vector is 256 bits in length (i.e., 32 bytes), the data elements being operated on are four-byte words, and the operation is adding a value to the data elements, these embodiments can add the value to any number of the eight words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address that is used by execution unit 302 for performing a set of memory accesses in parallel. In these embodiments, if one or more elements of the vector contain invalid memory addresses, invalid memory-read operations can occur. In these embodiments, invalid memory-read operations that would otherwise result in program termination instead cause any elements with valid addresses to be read and elements with invalid elements to be flagged, allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

FSR 214 is a memory element that includes a number of bit positions (e.g., individual memory circuits) that can be used by processor 102 to record element positions for vector operations for which faults were masked. In the described embodiments, processor 102 supports a number of different vector instructions and/or operations that can be configured by default and/or can be overridden (e.g., using a software switch, control element, setting, etc. in processor 102) to enable processor 102 to mask (i.e., at least temporarily ignore) fault conditions encountered for at least some of the elements of the vector instruction/operation. For example, the described embodiments can support fault masking for vector read instructions, vector write instructions, vector mathematical instructions, and/or other vector instructions/operations. In these embodiments, upon masking a fault for an element of a vector instruction/operation, processor 102 clears the corresponding bit position and any subsequent bit positions in FSR to indicate that the fault was masked (in some embodiments, processor 102 clears only the corresponding bit position in FSR 214). Processor 102 can then subsequently read FSR 214 to determine if at least one element of the vector instruction/operation encountered a fault condition that was masked by processor 102. As described below, the described embodiments include a Confirm instruction that causes processor 102 to read FSR 214 and cause a fault if an active position in FSR 214 indicates that a fault was masked (e.g., contains a zero). Recall that an active bit position of the FSR is one for which a corresponding element of a predicate vector for the Confirm instruction is active.

The number of bit positions/memory elements in FSR 214 is sufficient to record masked faults for the widest possible vector instruction supported in processor 102. For example, assuming that the widest vector instruction supported in processor 102 is N elements wide (where N can equal, e.g., 64, 128, 357, etc.), FSR 214 can include N bit positions/individual memory circuits. FSR 214 may also include other control mechanisms that are used when performing operations using FSR 214. For example, in some embodiments, FSR 214 can include status bits such as a valid bit that indicates that the value in FSR 214 is valid/invalid.

In some embodiments, a bit position in FSR 214 is set to zero (or "cleared") to record that a fault was masked for a corresponding vector element, and is otherwise set to 1. In alternative embodiments, a bit position can be set to another value to indicate a masked fault (e.g., 1, T, etc.). Generally, any value that can be used to indicate that a fault was masked can be used in the described embodiments.

Although we describe processor 102 as including a particular set of units, in alternative embodiments, processor 102 can include different numbers or types of units. In addition, although vector execution unit 210 is describe using particular mechanisms, alternative embodiments may include different mechanisms. Generally, vector execution unit 210 (and, more broadly, processor 102) comprises sufficient mechanisms to perform vector operations, including the operations herein described.

Executing a Confirm Instruction

Figure 4:
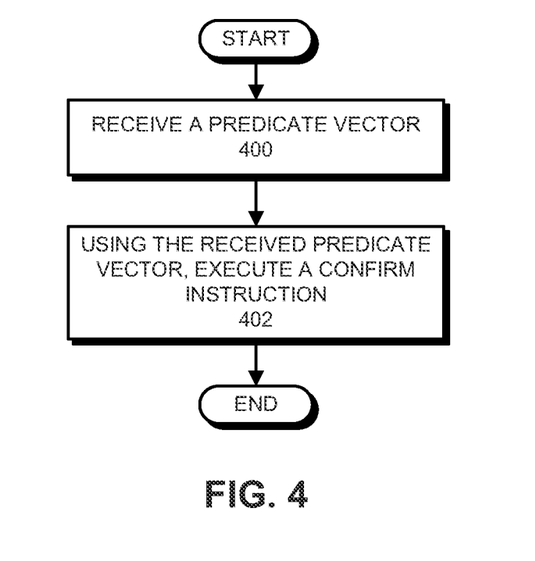
FIG. 4 presents a flowchart illustrating a process for executing program code in accordance with the described embodiments.

FIG. 4 presents a flowchart illustrating a process for executing program code in accordance with the described embodiments. As can be seen in FIG. 4, when executing program code, processor 102 receives a predicate vector that includes N elements (step 400). Next, using the received predicate vector, processor 102 executes a Confirm instruction (step 402).

Figure 5:
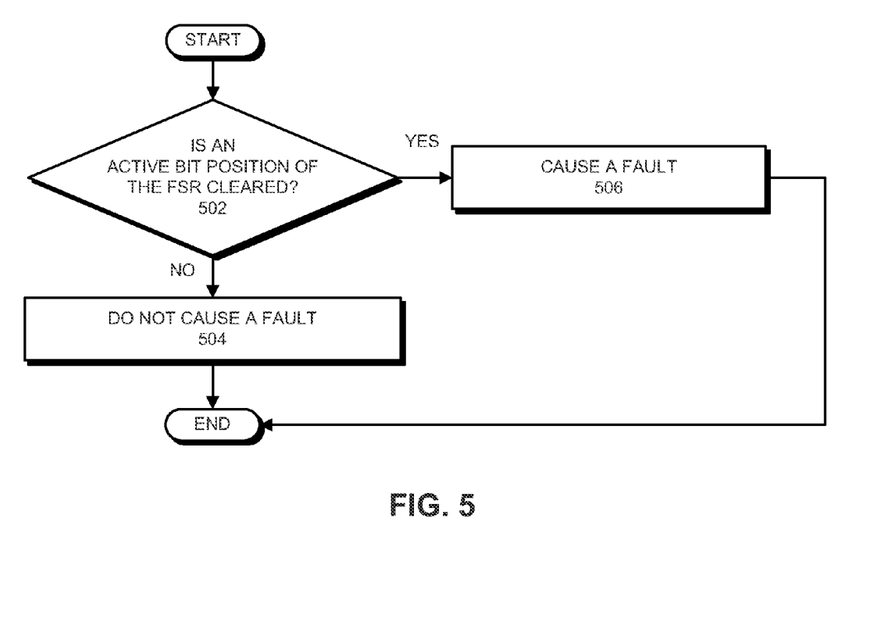
FIG. 5 presents a flowchart illustrating a process for executing a Confirm instruction in accordance with the described embodiments.

The predicate vector received in operation 400 can be the output of an earlier vector control instruction, and can indicate which bit positions of FSR 214 are active for the determination described below with respect to step 502.

In the examples in FIGS. 4-5, 0 and 1 values are used to describe the configuration of vectors/registers and the performance of operations, however, in different embodiments, other values can be used. For example, although the bit positions in FSR 214 are described as being cleared (i.e., set to zero) in the event that a fault is masked, in some embodiments, processor 102 sets the bit positions in FSR 214 (i.e., sets the bit positions to 1, T, or another value).

In the following examples, "corresponding elements" of the predicate vector are described with respect to bit positions in FSR 214. In the described embodiments, each bit position in FSR 214 represents a different element in vector instructions (and hence elements in vectors) in processor 102. Thus, a corresponding element for the predicate vector for a bit position in FSR 214 is an nth element in the predicate vector for an nth bit position in FSR 214.

For the following example, various states for FSR 214 are described. Recall that bit positions in FSR 214 can be cleared by processor 102 as processor 102 masks a fault for a vector instruction and/or operation. For example, if a vector read instruction encounters a fault condition (e.g., a read of an illegal address) in one or more elements, processor 102 can mask the fault(s) and clear a corresponding bit position in FSR 214. As another example, if a vector division operation encounters a division by zero in one or more elements, processor 102 can mask the divide-by-zero fault(s) and clear corresponding bit positions in FSR 214. Recall also that, in some embodiments, the vector instruction and/or operation continues normally for at least one element of the vector instruction and/or operation (e.g., the first element, etc.) after the fault is encountered and masked.

FIG. 5 presents a flowchart illustrating a process for executing a Confirm instruction in accordance with the described embodiments. In these embodiments, the operations shown in FIG. 5 are performed as part of step 402 in FIG. 4. Thus, for the purposes of describing the operations shown in FIG. 5, it is assumed that the predicate vector has been received, as shown in step 400 in FIG. 4.

When executing the Confirm instruction, processor 102 determines if an (i.e., at least one) active bit position of FSR 214 is cleared (step 502). (Where an active bit position of FSR 214 is one for which a corresponding element of the predicate vector is active.) If not, processor 102 does not cause a fault (step 504). Otherwise, if an active bit position is cleared, processor 102 causes a fault (step 506). For example, assuming that FSR 214 and the predicate vector pred contain the following values, the result of the Confirm instruction is as follows:

FSR={1 1 1 1 1 1 0 0}
pred={0 0 1 1 1 1 1 1}
result=fault (seventh element)

As another example, assuming that FSR 214 and the predicate vector pred contain the following values, the result of the Confirm instruction is as follows:

FSR={1 1 1 0 0 0 0 0}
pred={1 1 1 0 0 0 0 0}
result=no fault

In this example, even though there is at least one masked fault recorded in FSR 214, processor 102 does not cause a fault, because the corresponding element of the predicate vector pred is not active in these positions. Note that processor 102 generally does not cause a fault when all active elements of FSR 214 are set (i.e., no faults are recorded as having been masked in active elements of FSR 214).

The foregoing descriptions have been presented only for purposes of illustration and description. They are not intended to be exhaustive or to limit the described embodiments to the forms disclosed. Accordingly, many modifications and variations will be apparent to practitioners skilled in the art. Additionally, the above disclosure is not intended to limit the described embodiments. The scope of these embodiments is defined by the appended claims.

What is claimed is:

1. A method for executing program code in a vector processor that includes a fault status register (FSR) with N bit positions, comprising:
receiving a predicate vector, wherein the predicate vector has N elements;
for a first set of bit positions in the FSR for which corresponding elements of the predicate vector are active,
determining if at least one of the first set of bit positions in the FSR holds a predetermined value; and
when at least one of the first set of bit positions in the FSR holds the predetermined value, causing a fault in the processor; and
not causing a fault in the processor when none of the first set of bit positions in the FSR holds the predetermined value or when one or more of a second set of bit positions in the FSR for which corresponding elements of the predicate vector are inactive hold the predetermined value.

2. The method of claim 1, wherein, before receiving the predicate vector, the method further comprises:
performing a vector operation for each of N elements, wherein the operation for each element potentially causes a fault; and
upon determining that at least one element of the vector operation has encountered a fault condition, masking a fault for the at least one element and setting a corresponding bit position of the FSR to the predetermined value, wherein masking the fault comprises finishing performing the vector operation without immediately handling the fault.

3. The method of claim 2, wherein setting a corresponding bit position of the FSR to the predetermined value comprises setting the bit position and any subsequent bit positions of the FSR to the predetermined value.

4. The method of claim 1, wherein causing a fault in the processor comprises terminating at least one program that is being executed by the processor.

5. The method of claim 1, wherein the set of positions in the FSR for which corresponding elements of the predicate vector are active comprises one or more bit positions in the FSR.

6. The method of claim 1, wherein the predetermined value is a zero.

7. The method of claim 1, wherein the predetermined value is a one.

8. A processor that executes program code, comprising:
the processor; and
a fault status register (FSR) with N bit positions in the processor;
wherein the processor is configured to:
receive a predicate vector, wherein the predicate vector has N elements;
for a first set of bit positions in the FSR for which corresponding elements of the predicate vector are active,
determine if at least one of the first set of bit positions in the FSR holds a predetermined value; and
when at least one of the first set of bit positions in the FSR holds the predetermined value, cause a fault in the processor; and
not causing a fault in the processor when none of the first set of bit positions in the FSR holds the predetermined value or when one or more of a second set of bit positions in the FSR for which corresponding elements of the predicate vector are inactive hold the predetermined value.

9. The processor of claim 8, wherein, before receiving the predicate vector, the processor:
performs a vector operation for each of N elements, wherein the operation for each element potentially causes a fault; and
upon determining that at least one element of the vector operation has encountered a fault condition, masks a fault for the at least one element and sets a corresponding bit position of the FSR to the predetermined value, wherein masking the fault comprises finishing performing the vector operation without immediately handling the fault.

10. The processor of claim 9, wherein, when setting a corresponding bit position of the FSR to the predetermined value, the processor sets the bit position and any subsequent bit positions of the FSR to the predetermined value.

11. The processor of claim 8, wherein, when causing a fault in the processor, the processor terminates at least one program that is being executed by the processor.

12. The processor of claim 8, wherein the set of positions in the FSR for which corresponding elements of the predicate vector are active comprises one or more bit positions in the FSR.

13. The processor of claim 8, wherein the predetermined value is a zero.

14. The processor of claim 8, wherein the predetermined value is a one.

15. A computer system that executes program code, comprising:
a processor;
a fault status register (FSR) with N bit positions in the processor; and
memory coupled to the processor, wherein the memory stores instructions and data for the processor;
wherein the processor is configured to:
receive a predicate vector, wherein the predicate vector has N elements;
for a first set of bit positions in the FSR for which corresponding elements of the predicate vector are active,
determine if at least one of the first set of bit positions in the FSR holds a predetermined value; and
when at least one of the first set of bit positions in the FSR holds the predetermined value, cause a fault in the processor; and
not causing a fault in the processor when none of the first set of bit positions in the FSR holds the predetermined value or when one or more of a second set of bit positions in the FSR for which corresponding elements of the predicate vector are inactive hold the predetermined value.

16. The computer system of claim 15, wherein, before receiving the predicate vector, the processor:

performs a vector operation for each of N elements, wherein the operation for each element potentially causes a fault; and upon determining that at least one element of the vector operation has encountered a fault condition, masks a fault for the at least one element and sets a corresponding bit position of the FSR to the predetermined value, wherein masking the fault comprises finishing performing the vector operation without immediately handling the fault.

17. The computer system of claim 16, wherein, when setting a corresponding bit position of the FSR to the predetermined value, the processor sets the bit position and any subsequent bit positions of the FSR to the predetermined value.

18. The computer system of claim 15, wherein, when causing a fault in the processor, the processor terminates at least one program that is being executed by the processor.

19. The computer system of claim 15, wherein the set of positions in the FSR for which corresponding elements of the predicate vector are active comprises one or more bit positions in the FSR.

20. The computer system of claim 15, wherein the predetermined value is a zero.

21. The computer system of claim 15, wherein the predetermined value is a one.

* * * * *